Figure 1:
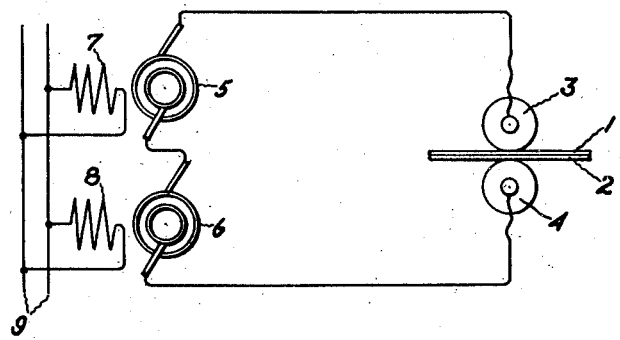

Aug. 30, 1927.

E. M. HEWLETT

RESISTANCE LINE WELDING

Filed Nov. 22, 1924

1,640,449

Inventor:
Edward M. Hewlett,
by
His Attorney.

Patented Aug. 30, 1927.

1,640,449

UNITED STATES PATENT OFFICE.

EDWARD M. HEWLETT, OF SCHENECTADY, NEW YORK, ASSIGNOR TO GENERAL ELECTRIC COMPANY, A CORPORATION OF NEW YORK.

RESISTANCE LINE WELDING.

Application filed November 22, 1924. Serial No. 751,660.

My invention relates to resistance line welding systems wherein the electric current supplied to the weld is periodically varied in value to permit alternate heating and cooling of the metal parts forming the weld, and has for its object the provision of an improved arrangement for predetermining the length of the periods during which the metal of the weld is maintained above and below its welding temperature.

In resistance line welding, it is customary to transmit current to the weld through electrodes which are pressed into contact with the work and to provide some means of producing relative movement between the electrodes and the work, or metal parts to be welded together. When the electrodes are thus forced against the heated metal parts, difficulty is frequently encountered due to the fact that the edges of the electrodes tend to sink into the heated metal in a manner to cause it to burn and buckle. This, of course, seriously interferes with the welding operation. In order to obviate this difficulty, it has been proposed to vary the value of the current transmitted through the weld either by periodically interrupting the primary circuit of the welding transformer or by periodically reducing the current to a value insufficient to maintain the metal of the weld at its welding temperature. In United States Letters Patent No. 1,522,993 to Peter P. Alexander, and assigned to the same assignee as the present application, is disclosed a welding system wherein current is supplied to the weld at a frequency sufficiently low to permit intermittent cooling of the weld metal to a point below welding temperature.

As pointed out in the aforementioned Letters Patent, a cavity is formed in the heated metal by the electrode during the interval when the value of the current is sufficiently high to produce a weld and ridges of heated metal are formed ahead and behind the electrode in the line of the weld. During the interval when the current is below its welding value, the metal cools and the electrodes ride up on the ridges which are ahead of the electrode and these ridges serve to interpose a comparatively high resistance circuit between the electrodes just at the instant when the current is again raised to its welding value. In this manner, it is possible to form a continuous weld made up of a series of overlapping spot welds which correspond in number to the number of times the weld metal is heated above its welding temperature. To ensure the formation of a perfect continuous line weld, it is necessary that each spot weld overlap the preceding spot weld by the same amount. This result can be accomplished only by proper coordination between the length of the electrode contact, the speed at which the electrodes and the work are moved relatively to one another, and the frequency of the current transmitted through the weld; but in any case it is necessary to supply current which changes from a welding to a non-welding value and back again to a welding value at intervals which are correctly timed with respect to one another. In accordance with my invention, the proper timing of these intervals is produced by combining current waves of different frequencies to produce a succession of pulsations or beats in the value of the resultant current transmitted through the weld.

My invention will be better understood from the following description when considered in connection with the accompanying drawing and its scope will be pointed out in the appended claims.

Figure 2:
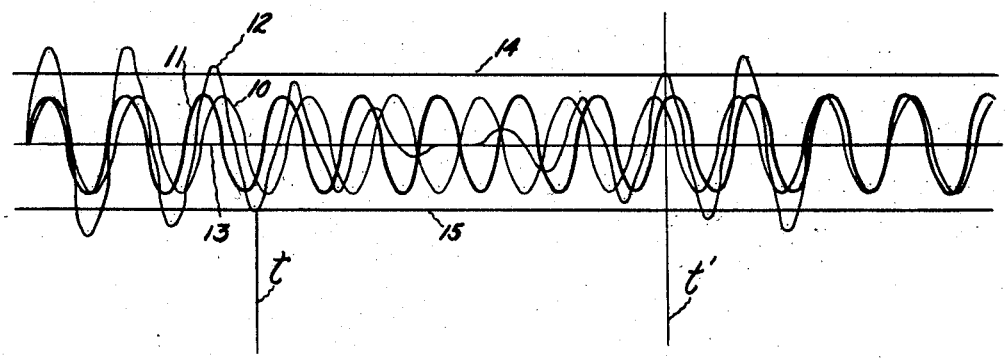

Referring to the drawing, Fig. 1 shows a welding system in which my invention has been embodied; and Fig. 2 is a set of curves showing the manner in which the resultant current supplied to the weld varies in value from instant to instant.

Fig. 1 shows a pair of metal parts 1 and 2 which are to be welded together. Current for performing this operation is supplied to the weld through the electrodes 3 and 4 from two sources adapted to supply current at different frequencies and illustrated at a pair of series-connected alternating current generators 5 and 6. Field current is supplied to the windings 7 and 8 of the generators 5 and 6 respectively through the conductors 9 from any suitable source.

As previously indicated, the generators 5 and 6 are arranged to operate at frequencies which differ slightly from one another. Any suitable means for producing this result may be utilized. In order to facilitate an understanding of the invention, the generators may be considered as driven by the same prime mover or other driving means through gears, these gears being so arranged as to ensure that the generators 5 and 6 supply currents at 60 and 66 cycles respectively when their field windings are excited by direct current. Under these conditions, the instantaneous values of the currents supplied by the generators 5 and 6 may be represented by the curves 10 and 11 respectively of Fig. 2 and the corresponding values of the resultant current supplied to the weld may be represented by the curve 12 of the same figure.

In the curves of Fig. 2, time is plotted as abscissae along the line 13 and positive values of current are plotted above the line 13 while negative values of current are plotted below this line. As will be observed by reference to the curves, the generators 5 and 6 are assumed to supply substantially equal amounts of current. Under these conditions, the value of the resultant current is substantially twice that of each of the generators when the peaks of the current waves are in phase. Due to the difference in the frequencies of the currents, however, the phase relation between the peaks of the waves is constantly changing so that the two waves have their maximum value in the same direction at one instant and at a later instant have their maximum values in opposite directions. The resultant current supplied to the weld thus assumes a series of values which vary between the sum of the two currents and their difference or zero. Between the instants at which these two values of current occur, the resultant current assumes a variety of different values, some of which may be above and others of which may be below the value of current required to produce a weld. Thus assuming the value of the current required to produce a weld to be represented by the lines 14 and 15, it will be observed that during the interval $t$—$t'$ the metal is allowed to cool while during the preceding and succeeding intervals, it is maintained at a temperature suitable for welding. My invention therefore affords a simple and reliable means for predetermining the frequency with which the metal of the weld is heated and cooled. It will be noted that the result is accomplished without the use of a low frequency generator and that the currents of different frequency may be supplied from sources of different frequency or from the same source through any suitable type of frequency changer.

I have explained my invention by illustrating and describing a certain specific embodiment thereof, but it will be readily understood by those skilled in the art that the arrangement of this embodiment may be modified in certain of its details. I, accordingly, do not wish to be restricted to the particular arrangement disclosed herein by way of example for the purpose of setting forth my invention in accordance with the patent statutes. The terms of the appended claims are, therefore, not restricted to the precise arrangement disclosed, but are intended to cover all changes and modifications within the true spirit and scope of my invention.

What I claim as new and desire to secure by Letters Patent of the United States is:—

1. The method of resistance line welding which comprises continuously transmitting currents of different frequencies through the weld metal for periodically varying the value of the resultant current transmitted through said metal in a manner to cause it to be alternately heated to its welding temperature and cooled to a temperature at which it hardens.

2. A resistance line welding system comprising a pair of electrodes, and current supply means including a plurality of sources of alternating current arranged to be operated at different frequencies and substantially the same voltage for transmitting through said electrodes a resultant current having a value which periodically varies between the sum and difference of the currents supplied by said generators.

3. A resistance welding system comprising a pair of electrodes, and current supply means including a pair of series-connected sources of alternating current arranged to be operated at different frequencies and substantially the same voltage for transmitting through said electrodes a resultant current having a value which periodically varies between the sum and difference of the currents supplied by said generators.

4. The method of resistance line welding which comprises continuously applying to the circuit through the welding electrodes alternating currents of different frequency and such amplitude that a resultant current is produced, the effective value of which varies periodically between a welding value and a non-welding value.

5. The method of resistance welding which comprises combining current waves of different frequencies to produce a succession of beats in the value of the resulting current transmitted through the parts to be welded.

In witness whereof, I have hereunto set my hand this 21st day of November, 1924.

EDWARD M. HEWLETT.